United States Patent

Schultz

[15] 3,689,533

[45] Sept. 5, 1972

[54] PRODUCTION OF CARBOXYLIC ACIDS AND ESTERS

[72] Inventor: Robert G. Schultz, Vinita Park, Mo.

[73] Assignee: Monsanto Company, St. Louis, Mo.

[22] Filed: March 15, 1971

[21] Appl. No.: 124,476

Related U.S. Application Data

[63] Continuation-in-part of Ser. No. 701,639, Jan. 30, 1968, abandoned.

[52] U.S. Cl. ............260/488 K, 252/430, 252/431 R, 252/431 N, 252/431 P, 252/434, 252/441, 260/410.9 R, 260/413, 260/475 PN, 260/476 R, 260/485 G, 260/491, 260/493, 260/496, 260/515 P, 260/515 R, 260/532, 260/537 R, 260/540, 260/541

[51] Int. Cl. ....C07c 51/12, C07c 51/14, C07c 67/00

[58] Field of Search....260/410.9, 413, 515 R, 515 P, 260/475 PN, 476 R, 491, 485, 537 R, 493, 496, 541, 532, 488 K

[56] References Cited

UNITED STATES PATENTS

| | | | |
|---|---|---|---|
| 2,710,878 | 6/1955 | Glasebrook | 260/532 |
| 2,739,169 | 3/1956 | Hagemeyer, Jr. | 260/540 |
| 3,020,314 | 2/1962 | Alderson | 260/533 |
| 3,065,242 | 11/1962 | Alderson et al. | 260/533 |
| 3,161,672 | 12/1964 | Zachry | 260/486 |
| 3,338,961 | 8/1967 | Classon et al. | 260/514 |
| 3,367,961 | 2/1968 | Brewbaker | 260/486 |

OTHER PUBLICATIONS

Tsuji et al., J. A. C. S., V. 86, pp. 4,350–4,353, Oct. 20, 1964.

*Primary Examiner*—Vivian Garner
*Attorney*—L. Dan. Tucker et al.

[57] ABSTRACT

The present invention relates to a process for the preparation of carboxylic acids and esters, specifically by the reaction of alcohols and carbon monoxide in the presence of a supported catalyst comprising the decomposition products of rhodium nitrate on a carrier, the said reaction being conducted in the presence of a halide promoter. The process is also directed to the production of mixtures of organic acids together with organic esters.

9 Claims, 1 Drawing Figure

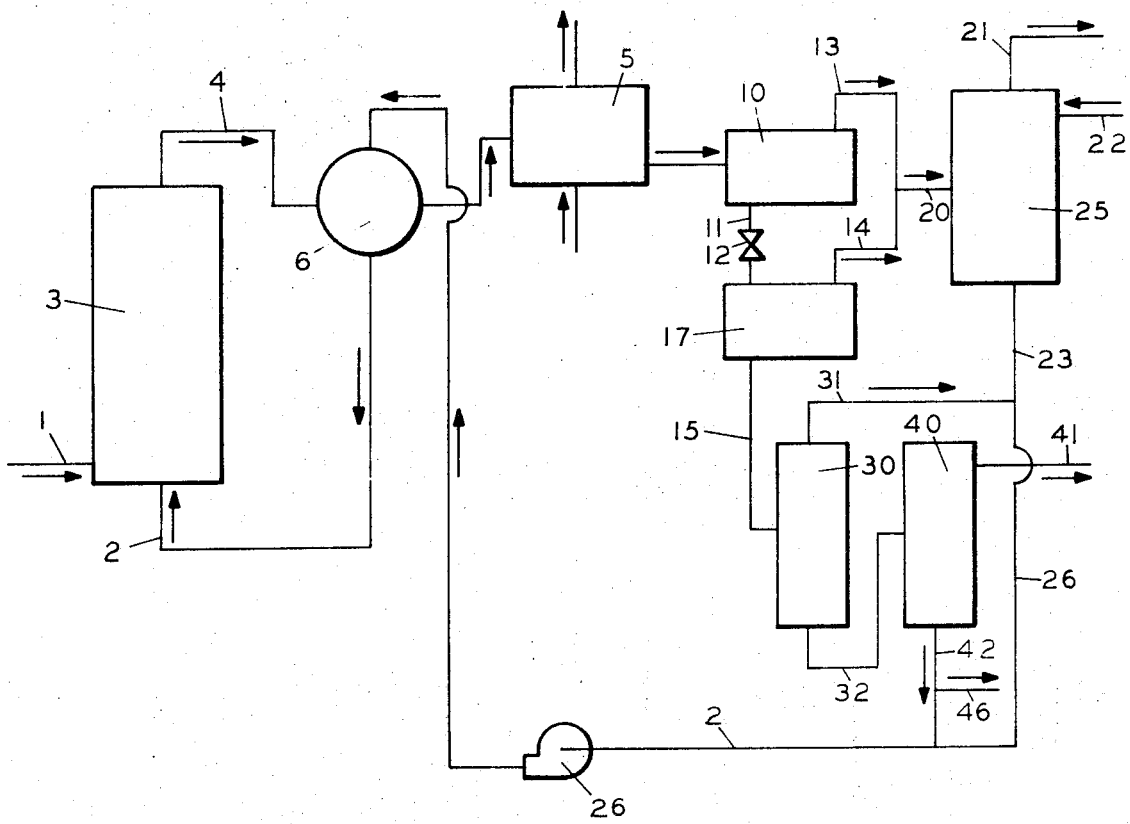

PRODUCTION OF CARBOXYLIC ACIDS AND ESTERS

CROSS REFERENCE TO RELATED APPLICATIONS

This application is a continuation-in-part of my copending application Ser. No. 701,639 filed Jan. 30, 1968, now abandoned.

BACKGROUND OF THE INVENTION

This invention relates to a process for the preparation of carboxylic acids and esters. More particularly, it relates to a vapor phase process for the reaction of alcohols and carbon monoxide in the presence of catalyst compositions essentially comprising the decomposition product of rhodium nitrate dispersed on a carrier in the presence of a halide promoter to yield carboxylic acids and esters selectively and efficiently.

Carbonylation processes for the preparation of carboxylic acids from alcohols are well known in the art and have been directed especially to the production of acetic acid by the carbonylation of methanol. The prior art teaches the use of a number of catalysts for the synthesis of carboxylic acids by reaction of alcohols with carbon monoxide at elevated temperatures and pressures in both gas phase fixed bed reactions and liquid phase reactions. Catalysts such as phosphoric acid, phosphates, heavy metal salts such as zinc and cuprous chlorides, silicates of various metals, and boron trifluoride in various hydration states have been reported to function for the production of acetic acid by reaction of methyl alcohol and carbon monoxide at elevated temperatures and pressures of the order of 400° and 10,000 psig, respectively. However, even under such severe conditions the yields of acid were substantially poor, and, therefore, uneconomical. Somewhat less severe reaction conditions of temperature and/or pressure have been reported in the literature employing specific catalyst compositions, e.g., 330°–340°C using liquid phosphoric acid containing copper phosphate; 300°–500°C, and 2,000–4,000 psig using active charcoal impregnated with phosphoric acid; and 260°–360°C and 2,800–15,000 psig using metal carbonyls, such as iron, cobalt and nickel, in conjunction with their halides or free halogens in the liquid phase. Even using these specific catalyst compositions at the less severe reaction conditions, substantially poorer yields of the desired carboxylic acid product and substantially slower reaction rates are obtained than those achieved in the process of this invention.

Certain disadvantages present in the carbonylation processes described in the prior art are catalyst instability, lack of product selectivity, and low levels of catalyst reactivity, and in process wherein there is a liquid phase present, the need for large and costly processing equipment for product isolation, as well as for catalyst recovery, catalyst regeneration and catalyst recycle to the reactor. One particular disadvantage of carbonylation processes of the prior art is their dependence upon the use of catalysts comprised of metals which readily form volatile carbonyls or metal carbonyls including dicobalt octacarbonyl, iron carbonyl and nickel carbonyl, all of which require the use of high partial pressures of carbon monoxide to remain stable under the necessarily high reaction temperatures employed. For example, dicobalt octacarbonyl requires partial pressures of carbon monoxide as high as 3,000 to 10,000 psig under normal carbonylation conditions of 175° to 300°C. In contradistinction, the present vapor phase process is effective at low pressures, e.g., down to a total pressure of one atmosphere or less.

Still another disadvantage or carbonylation processes disclosed in the prior art is their relatively low level of activity. This low level of activity requires higher catalyst concentrations, longer reaction times, and higher temperatures to obtain substantial reaction rates and conversions. Consequently, larger and costlier processing equipment is required.

Another disadvantage of carbonylation processes disclosed heretofore is their inability to maintain high selectivity to the desired carboxylic acid at temperatures required for high conversion levels and high reaction rates. At these higher temperatures, undesirable by-products comprising substantial amounts of aldehydes, higher carboxylic acids, carbon dioxide, methane and water are formed, thereby resulting in substantial yield losses and necessitating additional product purification and recycle steps in the processing.

One particular disadvantage of carbonylation processes of the prior art is their dependence upon the use of liquid phase catalyst systems comprised of cobalt carbonyls or certain modified cobalt carbonyls dissolved in a liquid reaction medium. In liquid phase systems, additional processing steps are necessary for separation of products from the catalyst solutions, and there are always handling losses of the catalyst. This handling of the catalyst solution in liquid phase processes requires the use of large and costly processing equipment for separation of the product, and for catalyst recovery and catalyst recycle to the reaction zone. Also, the losses of the metal component due to handling of the catalyst solutions are costly because the metals per se are very expensive. For example, the prior art carbonylation reaction utilizing a cobalt catalyst in liquid phase suffers a serious disadvantage due to substantial losses of the cobalt component by separation so that the cobalt plates out as an inactive coating on the walls of the reactors and piping. This is a serious defect since significant losses of catalyst occur.

The present invention using a solid catalyst comprising the rhodium component overcomes the above difficulties inherent in the handling and processing of a liquid reaction medium by providing a system for continuous separation of products from the solid catalytic phase. These advantages are even more important when utilizing a catalyst comprised of an expensive metal compound, where utilization in industrial applications requires an absolute minimum of catalyst losses.

It is, therefore, an object of the present invention to provide a process in which the catalyst is maintained in a solid phase so as to eliminate or minimize handling and losses of the catalyst.

Another disadvantage of carbonylation processes described in the prior art is their dependence on catalyst systems which require the use of substantially chemically pure carbon monoxide feedstocks to maintain high selectivity and high yield to the desired carboxylic acid product. For example, certain cobalt containing catalyst systems described heretofore when employed with carbon monoxide feed streams containing impurities such as hydrogen, result in the production of a number of undesirable byproducts including methane, carbon dioxide, aldehydes, alcohols of the same carbon number as the desired carboxylic acid, and carboxylic acids of higher carbon number than desired. Consequently, substantial loss in selectivity and yield to the desired carboxylic acid occurs. Catalysts of the prior art cause the formation of troublesome gaseous by-products such as carbon dioxide and methane as well as high proportions of ethers in the reactor system, thereby suppressing the carbon monoxide partial pressure and ultimately causing a decrease in the desired carbonylation reaction rate ( with the system at constant pressure).

It is, therefore, an object of the present invention to overcome the above disadvantages and thus provide an improved and more economically and commercially feasible carbonylation process for the production of organic acids and their esters.

Another object of this invention is to provide a more reactive and more stable carbonylation catalyst composition than has been theretofore described in the prior art.

Still another object of the present invention is to provide a more selective and more reactive carbonylation catalyst composition for the production of carboxylic acids.

Another object of the present invention is to provide a carbonylation catalyst composition which results in the production of a higher yield of the desired carboxylic acid with minimum formation of ethers, aldehydes, higher carboxylic acids, carbon dioxide, methane, water and other undesirable by-products.

Still another object of the present invention is the provision of an improved carbonylation process enabling the efficient and selective production of carboxylic acids or their esters by reaction of alcohols and alcohol derivatives with carbon monoxide in the presence of an improved and more stable catalyst, thus enabling the use of lower catalyst concentration, lower temperature, lower pressure, and shorter contact time than has been generally possible heretofore, and eliminating product isolation, catalyst recovery and recycle steps, and also solvent recovery.

Another object of the present invention is to provide novel heterogeneous catalysts comprising the combination of an inert carrier having dispersed thereon a rhodium component described below.

These and other objects of the present invention will become apparent to those skilled in the art from the accompanying description and disclosure.

SUMMARY OF THE INVENTION

In accordance with the present invention, alcohols have $n$ carbon atoms ($n$ is 1 to 10) are converted to a mixture comprised of an acid having $n+1$ carbon atoms and the ester of the said alcohol with the said acid, by reacting the alcohol or an alcohol derivative in the vapor phase with carbon monoxide at temperatures from 50° to 500°C and at partial pressures of carbon monoxide from 0.1 to 15,000 psia, preferably 5 to 3,000 psia, and more preferably 10 to 700 psia, although higher pressure may be employed, in the presence of a catalyst system essentially comprised of a rhodium component described below. The rhodium containing component is dispersed upon a carrier. The carrier or substrate which is employed in the present catalysts consists of a porous solid of such size that it can be employed in fixed or fluidized bed reactors, e.g., from 400 mesh/inch to ½-inch particle sizes. The range of variation of the pore volume relative to solid weight is from 0.03 to 2.5 cm$^3$/gram of the porous phase, with a preferred range of from 0.05 to 1.5 cm$^3$/gram.

The carrier materials are exemplified, but not limited by pumice, alumina, silica, silica-alumina, aged or deactivated silica-alumina cracking catalyst, magnesia, diatomaceous earth, bauxite, titania, zirconia, clays, both natural and acid treated such as the Super-Filtrols, attapulgus clay (attapulgite), lime, magnesium silicate, silicon carbode, activated and unactivated carbons, zerolites as well as the zeolitic molecular sieves, solid foams, such as ceramic honeycombs, and porous organic polymers. The above carriers are used as regular and irregular particles and as capillary tubes, and interspacing elements such as shapes, extrudates, ceramic rods, balls, broken pieces, tiles, and the like disposed within the reactor.

DESCRIPTION OF THE PREFERRED EMBODIMENTS OF THE PRESENT INVENTION

As referred to above, for purposes of the present invention the catalyst as charged consists of a rhodium component formed by the decomposition of rhodium nitrate dispersed upon the above mentioned supports. The catalyst essentially includes the nitrate decomposition products, which essentially includes rhodium oxide, as the active component. The catalyst may be composed of two distinct components, namely, the active catalyst portion, e.g., the aforesaid rhodium component, and a promoting portion as the second component which may or may not be catalytically active, but which aids the reaction in various ways, such as by facilitating cleavage of the carbon-oxygen bond in the alcohol, or by rendering the rhodium species less volatile or more stable. The promoter may thus be introduced at the catalyst preparation step or may be introduced into the catalyst from the reactants, with the resultant transformation of the precursor rhodium species to a more active form.

As a result of the contacting of the precursor rhodium nitrate decomposition products, essentially, rhodium oxide, with the promoter and feedstocks, the ultimate active rhodium species may exist as a coordination compound of rhodium, carbon monoxide, and a halide such as chloride, bromide, and iodide, as well as suitable amine, organo-phosphine, organo-arsine, and/or organostibine ligands and, if desired, other ligands, e.g., halide such as chloride, iodide and bromide and trihalostannate such as the corresponding chloride, bromide or iodide. Such ligands are necessary to satisfy the coordination number and oxidation number of the central metal atom, rhodium, and form a coordination compound or complex of rhodium in which it is possible that one or more other ligand positions is occupied by a group attached to the surface of the supporting structure, e.g., carbon.

The term coordination compound or coordination complex used throughout this specification means a compound or complex formed by combination of one or more electronically rich molecules or atoms capable of independent existence with one or more electronically poor molecules or atoms, each of which may also be capable of independent existence.

The process of thermal decomposition of rhodium nitrate dispersed upon a carrier may proceed by a variety of mechanisms. However, it is thought that a substantial part of the rhodium nitrate is converted to rhodium oxide and other oxygen containing rhodium species during the thermal treatment. Optionally, treatment of the rhodium nitrate decomposition products dispersed on said carriers with hydrogen at these elevated temperatures appears to cause at least partial reduction of these decomposition products to rhodium components of lower valency such as rhodium metal.

Modifying treatments of the present supported rhodium components described above may also be used to incorporate the promoting portion or second component of the catalyst system. Such promoting components include a halogen and/or halogen compound such as hydrogen halide, alkyl- or aryl-halide, metal halide, ammonium, phosphonium, arsonium, stibonium halide, etc., and may be the same or different from any halogen component already present in the active catalytic portion or first component of the catalyst system. Halogen or halide compounds are suitable for the promoter portion of the catalyst, but those containing iodine and bromine are preferred. Accordingly, suitable promoters comprising the second portion of the catalyst system of this invention may be selected from the following list of preferred halogen and/or halogen containing compounds:

$RX_n$ where R = alkyl-, alkylene ($n$ is $1-3$) or aryl-group and $X = Cl$, Br or I   e.g., $CH_3I$, $C_6H_5Br$, $CH_3CH_2I$, $ICH_2CH_2I$, etc.

$X_2$ or $X_3^-$ where $x = Cl$, Br or I,   e.g., $Br_2I_2$, $I_3^-$, etc.
HX where $X = Cl$, Br or I,   e.g., HBr, HI $\underset{\underset{O}{\parallel}}{R}CX$ where R = any alkyl-or aryl-group and $X = Cl$, Br or I   e.g., $\underset{\underset{O}{\parallel}}{C}H_3CI$, etc.

$R_4MX$, $R_4MX_3$ or $R_3MX_2$
where R = hydrogen or any alkyl- or aryl- group
M = N, P, As or Sb
R = Cl, Br or I
  e.g., $NH_4I$, $Ph_4I_3$, $PH_3I_2$, $PH_3Br_2$
($C_6H_5)_3PI_2$ and/or combinations of R, M and X The halogen promoter portion or second component of the catalyst may be charged to the reactor separately from the active catalyst or first component, or it may be incorporated onto the active component, for example, by impregnation onto the catalyst. The active supported rhodium compound or first component of the catalyst system may be prepared prior to charging into the reactor in a separate activation procedure or may be generated in the reactor. Subsequently, after the first component is in the reactor, the promoter or second component of the catalyst may be added in the feed as a gaseous or liquid compound or as a solution in a suitable solvent. However, the promoter portion of the catalyst may also be incorporated in the active catalyst or first component either during the activation or during the in situ generation of the active catalyst. For example, to prepare the catalyst system, the first component of the catalyst system, e.g., rhodium nitrate is dissolved in a suitable solvent, and is subsequently impregnated upon an inert support or carrier as discussed herein.

The solvent which is used to dissolve the rhodium nitrate starting material is a liquid having a low boiling point, e.g., high vapor pressure under reaction conditions. The range of variation of the boiling point (NBP, 760 mm Hg) is quite broad, a preferred range being from 10° to 140°C. A preferable group of volatile solvents includes chloroform, carbon tetrachloride, benzene, acetone, methanol, ethanol, isopropanol, isobutanol, pentane, hexane, cyclohexane, heptane, toluene, pyridine, diethylamine, acetaldehyde, acetic acid, tetrahydrofuran and water.

The preparation of the solid phase catalyst is carried out by first dissolving or dispersing the rhodium salt in the above described volatile solvent. The solid carrier is then impregnated with the solution of the rhodium salt, for example, by pouring the solution upon the carrier, or immersing the solid carrier in the excess of the liquid solution, with the excess being subsequently removed.

The impregnated support or carrier is then maintained at a temperature sufficient to volatilize the low boiling solvent, e.g., at a temperature between 15° and 325°C, to permit drying of the composite solid catalyst. A vacuum may also be applied to the catalyst in order to volatilize the solvent, although the use of vacuum is not essential. During this stage of the process, the volatile solvent evaporates from the solid catalytic product, and the rhodium nitrate is decomposed to form the active supported catalyst.

For example, to prepare the catalyst system, the first component of the catalyst system, e.g., a rhodium salt such as $Rh(NO_3)_3 \cdot 2H_2O$ is dissolved in a suitable solvent such as water. This solution may be impregnated upon a carrier or, alternatively, the solution may have the promoter added to the solution. The second or promoter component may, for example, be added to the above solution, e.g., as aqueous HI, or methyl iodide or other iodine or bromine containing compound.

This catalytic solution containing the necessary rhodium nitrate and halide components is then ready for impregnation upon the carrier as discussed above. Often it may be beneficial and desirable to have the concentration of the second component or promoter portion of the catalyst system, for example, iodide such as HI or $CH_3I$, in excess of that required to form a stoichiometric compound such as described above. The present discussion is based upon the catalyst precursors as charged. The ultimate nature of the catalyst as modified by reaction conditions, and the presence of promoters and reactants has not been completely elucidated. However, it has been found that the use of the components described herein provides a highly superior catalyst and process for the production of acids.

The thermal decomposition of the rhodium nitrate is carried out by heating the supported rhodium nitrate to a temperature in the range of from about 250°C to about 750°C. A more preferred temperature range for carrying out the thermal decomposition is within the range of about 275°C up to about 650°C. The thermal composition of the rhodium nitrate is effected by heating the supported rhodium nitrate within the above-mentioned temperature ranges for a period of from 1 minute up to 24 hours. Preferably, the period of time for heating the supported rhodium nitrate to effect the desired thermal decomposition is within the range of about 30 minutes to about 2 hours. Any pressure from a vacuum up to about 1,000 lb/sq. in. can be utilized during the heating process. From a practical standpoint, atmospheric pressure is desired to effect the thermal decomposition of the rhodium nitrate, because there is no necessity to utilize high pressure vessels during the thermal decomposition of the rhodium nitrate.

Suitable feedstocks are alcohols although the alcohol may be charged together with ether, alkyl halide or ester as discussed below. Preferred alcohols have one carbon atom less than the desired carboxylic acid product. These feedstocks also include halide, ester, and other derivatives of the desired alcohol feedstock.

Examples of preferred feedstocks employed for the carbonylation reaction of the present invention include the group of aliphatic alcohols having one to 20 carbon atoms, and aromatic alcohols having from six to 10 carbon atoms including methanol, ethanol, propanol and isopropanol, the butanols, pentanols, phenol and hexanols, and also the higher alcohols such as the decanols, including isomeric forms. For example, if acetic acid is the desired product, the feedstock may consist of methyl alcohol, or derivatives thereof, such as dimethyl ether, methyl acetate, methyl iodide and/or combinations of these. However, an alcohol is the preferred feedstock.

In accordance with the present invention, the carbonylation reaction may be carried out by intimately contacting an alcohol with gaseous carbon monoxide in the vapor phase. The temperature preferably is in the range of 50° to 500°C with the preferred range being 200° to 325°C. Partial pressures of carbon monoxide of the order of 0.1 to 15,000 psia may be employed; however, 5 to 3,000 psia carbon monoxide partial pressure is generally preferred and a more preferred range is from 10 to 700 psia. Higher pressures may be used if desired under appropriate conditions.

In a typical carbonylation process, selective to carboxylic acid, one mole of carbon monoxide reacts with each hydroxyl group (molar basis). More or less carbon monoxide from the aforesaid stoichiometric amount, however, may be present. Carbon monoxide streams containing inert impurities such as hydrogen, carbon dioxide, methane, nitrogen, noble gases, water and paraffinic hydrocarbons having from one to four carbon atoms may be employed, if desired, for example, from an available plant gas stream, to good effect; however, in such cases total reactor pressure will have to be increased to maintain a desired carbon monoxide partial pressure. The concentration of carbon monoxide in the feed gas mixture is from 1 vol. % to 99.9 vol. %, a preferred range being from 10 vol. % to 99.9 vol. %.

The reaction rate is dependent upon catalyst concentration upon the support and temperature. Concentrations of the rhodium compound or the first component of the supported catalyst system in the vapor phase, between 0.01 wt. % and 10 wt. % are normally employed, with the preferred range being 0.1 to 5 wt. %. Higher concentrations even to the extent of 20 wt. % may, however, be used if desired. Higher temperatures also favor higher reaction rates.

As a result of the use of a halogen promoter in the feed, as well as by initial incorporation of the promoter onto the support, the second component or promoter may accumulate upon the supported catalyst. The concentration of the second component or promoter portion on the support may vary widely over the broad concentration range of 0.01 to 30 wt. %, based on halogen atom. In the process of this invention, however, the preferred concentration range of promoter is 1 to 20 wt %, relative to the weight of the support.

In carrying out of the above described invention for the production of high proportion of acid, e.g., acetic acid, as the desired product, the charge to the reactor may be pure or may include by-products which are recycled with the alcohol feed. The purification system may, therefore, employ a distillation train to recover the acetic acid product by distillation, while the remaining lower boiling components are recycled, The present process may be operated to produce high proportions of the carboxylic acid or the ester of such carboxylic acids with the feed alcohol to obtain high productivity. Various alcohols may be charged as the alcohol feed, for example, the charging of ethanol yields as primary products propionic acid and ethyl propionate. If it is desired to increase the proportion of acid, the ester may be recycled to the primary reactor, or may be introduced into another reaction (together with water) for the purpose of forming the acid in a separate zone. When charging a mixture of alcohol and ester, there are particular molar ranges of ratios of alcohol to ester which are conducive to the formation of certain product distributions, with the broad range of 0.001 to 10,000 moles of alcohol per mole of ester.

Thus, the use of an alcohol-ester feed in a ratio of alcohol to ester no more than about 2, preferably 0.001 to 2 (and including a substantially pure ester as the feed) yields a product with a high proportion of acid, e.g., reaching substantially 100 percent carboxylic acid. Alternately, the use of a ratio of alcohol to ester greater than about 10, preferably 10 to 10,000 (including a substantially pure alcohol feed) yields a product with a very high proportion of the ester, e.g., reaching substantially 100 percent ester.

When esters, ethers or iodides are present in the feedstock, they are normally charged with equimolar amounts of water, although more or less water may be used. The reference to the esters, ethers or iodides in the above ratios, is on the basis that a molar quantity of water is present equivalent to the number of moles of ester, ether or iodide present. When the feed stocks consist only of the esters, ethers or iodides, water is an essential ingredient in the reaction.

Within the latter alcohol/ester feedstock ratio range of 10 to 10,000, there exist two alternative embodiments of the invention. In the first such embodiment, the product consists essentially of 100 percent ester at alcohol conversion levels up to about 90 mole percent, at above about 90 percent alcohol conversion level, the product is substantially completely the acid.

Similarly, ratios of alcohol to ester in the feed, in the range of 2 to 10, permit obtaining various proportions of acid and ester as mixtures in the product.

The above cases are summarized below:

| Alcohol/Ester Ratio | Major Product |
| --- | --- |
| 0.001 to 2 | acid |
| 2 to 10 | mixed acid and ester |
| 10 to 10,000 a) to about 90% alcohol conv. | ester |
| b) above about 90% alcohol conv. | acid |

An example of the above described embodiment for the production of high proportion of acid, e.g., acetic acid, as the desired product, the charge to the reactor includes a relatively low proportion of the alcohol. Thus in the production of acetic acid, the ratio is no more than 2 moles of methanol per mole of methyl acetate.

In carrying out a second embodiment, described above, for the production of high proportion of ester, e.g., methyl acetate, as the desired product, the charge to the reactor includes a relatively high proportion of the alcohol, e.g., greater than 10 moles of methanol per mole of methyl acetate. Consequently, the purification system employs a distillation train to recover the methyl acetate by distillation, while the remaining components consisting principally of the unreacted feedstocks, methyl iodide (or other halide promoters), methanol and water are recycled. The methyl acetate is hydrolyzed, for example, by contacting with steam, as described herein, thus isolating the acetic acid with the recovery of methyl alcohol, which may be recycled. However, the ester product is often used, per se, for example, as a solvent in chemical processing or for the formulation of coating compositions.

The reactants which are used in the present processes are essentially aryl- and alkyl-alcohols, and alcohol derivatives such as ethers, esters and organic halides having from one to 10 carbon atoms, including both straight chain and branched chain components. The second essential component is carbon monoxide. However, the carbon monoxide need not be a high purity stream such as has been required by prior art processes. Instead, the carbon monoxide may be a low concentration mixture containing from 1 to 99.9 vol. % of carbon monoxide, with the remainder of the gas mixture being comprised of gases selected from the group consisting of nitrogen, hydrogen, carbon monoxide, noble gases, water and paraffinic hydrocarbons having from one to four carbon atoms. Preferred ranges of carbon monoxide are from 30 to 70 vol. % carbon monoxide with the above gases.

It has been found that water generally exerts a beneficial effect on the rate of reaction. However, adding water, with the feed in excess of the equimolar quantity, e.g., an excess of 50 to 300 percent of such equimolar quantity, already present with ester, ether or iodide, as discussed above, promotes the production of the carboxylic acid. On the other hand, smaller quantities of water, e.g., 50 to 100 percent of the equimolar proportions discussed above, favor the production of ester.

The supported rhodium catalysts of the present invention are characterized by an unusually high degree of specificity for the carbonylation reaction, e.g., the reaction of alcohols with carbon monoxide to obtain a carboxylic acid. Such control over the various competing reactions to obtain the carboxylic acid in high yield is surprising since other metal catalysts do not show such specificity for this reaction. The iron group metals such as iron, cobalt and nickel differ from the present rhodium catalysts in that the iron group metals simultaneously catalyze the hydrogenation reactions. Consequently, the products from iron, cobalt or nickel catalysts include the next higher alcohols as well as aldehydes and carboxylic acids having two more carbon atoms than the starting alcohols. Furthermore, the iron group catalysts, particularly cobalt, require a far higher carbon monoxide partial pressure to remain active. When moderate pressures, e.g., less than about 2,000 psig carbon monoxide partial pressure are employed, at a temperature of 175°C, the cobalt catalyst is found to plate out or decompose to the free metal which plates on the walls of the reactor and is thus lost as a catalyst.

Another distinction of the rhodium catalysts over the cobalt catalysts is the elimination of undesirable gaseous by-products, including carbon dioxide and methane which are obtained as a result of the water-gas shift reaction catalyzed by cobalt. Furthermore, significant quantities of the undesirable by-product, dimethyl ether, are also formed in the presence of the cobalt catalyst system. This ether compound attains a very high partial pressure at the reaction conditions employed and necessitates the use of a high total pressure reaction system to maintain the necessary partial pressure of carbon monoxide for reaction to form carboxylic acids, e.g., 2,000 psig total pressure for 750 psig carbon monoxide partial pressure, at a reaction temperature of 175°C.

The present rhodium catalysts are also superior to catalysts typical of the platinum group. For example, the present rhodium catalyst operates at yields greater than 95 percent to the carboxylic acid at substantially 100 percent alcohol conversion. In contrast, an analogous catalyst prepared by thermally decomposing supported palladium nitrate shows only 1 percent of the activity of the present rhodium catalyst derived from the thermal decomposition of rhodium nitrate under comparable reaction conditions.

BRIEF DESCRIPTION OF THE DRAWINGS

For a better understanding of the process of the present invention, the drawings form a part of the present specification and also illustrate certain embodiments of the invention but are not limitative thereto. FIG. 1 illustrates a process wherein the carbon monoxide is introduced by line 1 into the reactor 3 containing the supported rhodium catalyst. The gas stream may also contain components which are inert to the reaction, such as hydrogen, nitrogen, ethane, etc., in addition to the carbon monoxide, The reactor 3 contains 1,000 pounds of a catalyst composed of activated carbon of ¼-inch particle size, containing 1 percent by weight of a rhodium component calculated as elemental rhodium and prepared as discussed above.

The normal gas rate to the reactor 3 is 85 lb/min of carbon monoxide, The reactor operates at 275°C and 100 psig pressure. Line 2 serves to introduce methanol feed plus recycled methyl acetate, unreacted methanol, methyl iodide, etc.

The gaseous reactor effluent exits through line 4 and is used to preheat the feed in exchanger 6. Line 4 is further cooled in exchanger 5, and goes to high pressure separator 10. The condensed liquid from separator 10 is removed through line 11; the pressure is let down through valve 12, and the liquid then goes to low pressure separator 17. The gas leaving the low pressure separator 17, through line 14, consisting principally of carbon monoxide, methyl iodide, methanol and methyl acetate, mixes with the gas effluent from the high pressure separator line 13 which is principally carbon monoxide, and enters the methanol scrubber 25 through line 20. In the scrubber 25, feed methanol introduced through line 22 at a rate of about 80 lb/min is used to remove the small amount of methyl iodide, methyl acetate, acetic acid, and other volatile components from the gas before it leaves the system. The effluent gas exiting through line 21 may either be recycled or, if the inert gas content is high, it may be vented or burned. The feed methanol and recovered components are removed from scrubber 25 through line 23.

The liquid effluent from separator 17 is removed through line 15. This effluent is introduced into distillation column 30 where the lower boiling compounds are separated from acetic acid. The lower boiling components consisting princiapply of methyl acetate, methyl iodide, unreacted methanol, and other volatile components, exit through line 31 and mix with the liquid effluent from the scrubber, line 23 to become line 26.

The acetic acid and other higher boiling compounds are removed as line 32 from column 30 and enter distillation column 40. In this column, acetic acid which may contain water is separated from the other high boiling components.

The acetic acid product is withdrawn as line 41 and this product may be further purified to remove water. The high boiling components exit through line 42 and mix with line 26 to become the reactor feed, line 2, after being pressured through pump 24 and preheated in exchanger 6. A small liquid purge stream may be withdrawn as line 46 to prevent build-up of high boiling compounds.

The process of the present invention may be operated either as a batch or a continuous process. The present solid catalyst may be employed as a fixed or fluid bed. The reactor may consist of a series of catalyst beds with interstage cooling between the beds or the catalyst may be placed in tubes with a heat exchange medium around the tubes. These tubes containing catalyst may be run in parallel or series. The metal content of the catalyst may be varied through the reactor to provide operating advantages. A bed of the catalyst support, per se, without components, may also be used so that the gas stream passes through such a bed in order to pick up any catalyst swept out of the reactor. It is also an embodiment of the invention to use either up-flow or down-flow of the reactants through the reactor, with periodic reversal of the gas stream also being contemplated, to provide operating advantages such as maintaining a clean catalyst bed.

For a better understanding of the process of the present invention, specific embodiments of the process are presented below. These examples and illustrations are not to be construed in any way limiting to the scope of the invention. The preparation of catalysts for the process of this invention is carried out using a variety of methods.

In a preferred method, the rhodium component is dispersed upon an inert support and the promoter is subsequently added in the reactor feed.

EXAMPLE 1

This example illustrates a method of catalyst preparation. A solid supported catalyst containing a rhodium component dispersed upon an inert support is prepared in the following manner: 3.0 grams of rhodium nitrate dihydrate having the formula $Rh(NO_3)_3 \cdot 2H_2O$ is dissolved in 50 ml of water as solvent. The resulting solution is added to 30 g of a support consisting of 12–30 mesh high surface area carbon.

The mixture is dried at 25°C in air for 8 to 16 hours and then vacuum dried at 110°C for 8 to 16 hours. The catalyst is then thermally decomposed in nitrogen at 275°C for 1 hour. The supported catalyst (10 ml) is charged into an 18-inch Pyrex glass vertical reactor 30 mm in diameter. The resulting catalyst bed, 2 cm in depth, is covered with 100 ml of inert packing as a preheater. The process is conducted at a feed rate (moles per hour) of $CH_3OH$, 0.27: $CH_3I$, 0.02: and CO, 0.50. The pressure at which the gaseous reactants contact the supported catalyst is 1 atm. at a reaction temperature of 210°C.

The reactor effluent contains the desired carboxylic acid product, including the ester of the acid product and alcohol feedstock, water and unreacted alcohol, carbon monoxide and promoter. The selectivity of alcohol conversion to the desired carboxylic acid and its ester is essentially 100 percent. Chromatographic analysis indicates that no substantial production of by-products such as aldehydes, higher boiling carboxylic acids and/or alcohols, methane or carbon dioxide occurs.

The conversion obtained in this example amounts to 17.7 g total acetate/g Rh/hr ( acetate includes acetic acid and the methyl acetate which is easily converted to acid). The isolated product is found to have the following analysis in weight percent:

|               | Weight, % |
| ------------- | --------- |
| Methyl Ether  | 0.6       |
| Methanol      | 49.6      |
| Methyl Iodide | 17.2      |
| Methyl Acetate| 24.6      |
| Acetic Acid   | 3.0       |
| Water         | 5.0       |

Thirty-six wt. % of the methanol fed to the reactor is converted to products. When the above example is repeated using the molar equivalent amount of 2.37 g rhodium trichloride trihydrate having the formula $RhCl_3 \cdot 3H_2O$ in place of the rhodium trinitrate dihydrate, the comparable results are production of 8.4 g acetate/g Rh/hr with the isolated product having the following analysis in weight percent.

| | Weight, % |
|---|---|
| Methyl Ether | 0.5 |
| Methanol | 66.0 |
| Methyl Iodide | 15.5 |
| Methyl Acetate | 14.1 |
| Acetic Acid | 1.0 |
| Water | 2.9 |

Fifteen wt. % of the methanol fed to the reactor is converted to products. In a similar manner when the procedure of this example is modified by inclusion of 0.16 moles/hr of water in the gaseous feed, a conversion of 13.2 g acetate/g Rh/hr is obtained.

When this experiment is conducted in separate tests with the equivalent molar quantity of cobalt nitrate decomposition products, only trace proportions of acetic acid are obtained (together with traces of higher acids and esters), while the corresponding use of ruthenium nitrate decomposition products shows less than 10 percent of the productivity of the above rhodium nitrate decomposition products.

EXAMPLE 2

This example illustrates another method of catalyst preparation. A solid supported catalyst containing a rhodium component dispersed upon an inert support is prepared in the following manner: 3.00 grams of rhodium nitrate dihydrate having the formula $Rh(NO_3)_3 \cdot 2H_2O$ is dissolved in 50 ml of water as solvent. The resulting solution is added to 30 g of a support consisting of 12–30 mesh high surface area carbon.

The mixture is dried at 25°C in air for 8 to 16 hours and then vacuum dried at 110°C for 8 to 16 hours. The catalyst is then decomposed, predominantly to rhodium oxide, in nitrogen at 275°C for one-half hour. The catalyst is then reduced in hydrogen at 330°–350°C for two hours. The supported catalyst (10 ml) is charged into an 18-inch Pyrex glass vertical reactor 30 mm in diameter. The resulting catalyst bed, 2 cm in depth, is covered with 100 ml of inert packing as a preheater. The process conditions are as described in Example 1.

The reactor effluent contains the desired carboxylic acid product, including the ester of the acid product and alcohol feedstock, water and unreacted alcohol, carbon monoxide and promoter. The selectivity of alcohol conversion to the desired carboxylic acid and its ester is essentially 100 percent. Chromatographic analysis indicates that no substantial production of by-products such as aldehydes, higher boiling carboxylic acids and/or alcohols, methane or carbon dioxide occurs.

The conversion obtained in this example amounts to 14.5 g acetate/g Rh/hr and the isolated product is found to have the following analysis in weight percent.

| | Weight, % |
|---|---|
| Methanol | 55.8 |
| Acetic Acid | 0.8 |
| Methyl Acetate | 15.2 |
| Methyl Iodide | 19.1 |

EXAMPLES 4–8

Examples 4–8 are shown in Table 1 and demonstrate the beneficial effects of operating the carbonylation process at higher temperature and pressure.

Significant increase in reactivity occurs at higher temperature and/or pressure with no ill effect on the supported rhodium catalyst system. By suitable adjustment of operating conditions, productivity of carbonylated product (carboxylic acid plus carboxylate portion of ester) in terms of grams of product per hour per gram of rhodium can exceed values of 300 grams of acetate per hour per gram rhodium. The catalyst life of the above catalyst is greater than 500 hours.

TABLE 1.—CATALYST OF EXAMPLE 1 AT VARIOUS OPERATING CONDITIONS $Rh(NO_3)_3 \cdot 2H_2O$/BPL CARBON

| Example | Operating conditions | | | | | Product distribution, wt. percent | | | | CH₃OH conversion |
|---|---|---|---|---|---|---|---|---|---|---|
| | Temp., °C | Total press., p.s.i.g. | Partial press., CO, p.s.i.a. | Feed rate, ml./hr. | Molar feed ratio MeI:MeOH:CO | CH₃OH | CH₃COOH | CH₃CO(OCH₃) | CH₃I | |
| 4 | 226 | 50 | 41 | 5.28 | 1 12.7 24.2 | 52.9 | 3.2 | 31.4 | 12.3 | 18.5 |
| 5 | 273 | 200 | 145 | 3.97 | 1 12.3 26.2 | 1.0 | 55.5 | 28.0 | 15.6 | 76.1 |
| 6 | 225 | 100 | 77 | 1.77 | 1 64.5 133 | 28.8 | 9.1 | 57.8 | 4.2 | 35.6 |
| 7 | 210 | 200 | 145 | 1.77 | 1 295 600 | 75.6 | 0.1 | 23.7 | 0.4 | 10.6 |
| 8 | 238 | 200 | 145 | 1.75 | 1 13.2 30 | 0.5 | 60.6 | 24.0 | 14.8 | 79.8 |

EXAMPLE 9

Wherein the process of Example 1 is conducted employing individual runs, which use equimolar feeds of ethanol and n-butanol, respectively, in place of the methanol, the corresponding major products are propionic and pentanoic acids, respectively.

EXAMPLE 10

This example demonstrates that the reaction may be carried out in the presence of hydrogen without the formation of undesirable products such as acetaldehyde, ethanol nor catalyst decomposition. This example is similar to Example 1 except that the reaction is carried out with a CO gas feed varying from the pure CO of Example 1, by containing hydrogen as an impurity, e.g., 62 vol. % carbon monoxide and 38 vol. % hydrogen. The results are similar to that of Example 1. No substantial amounts of reduced materials or other by-products such as aldehydes, dimethyl ether, ethanol, higher boiling carboxylic acids, methane, carbon dioxide, etc., are detected by gas chromatography, thus distinguishing from another parallel test using cobalt chloride catalyst, which yields such by-products as the result of hydrogenation catalyzed by the cobalt.

A similar result is obtained with another synthetic gas mixture, e.g., a 66 vol. % hydrogen, 33 vol. % carbon monoxide, such as is obtained from a commercial unit. The various impurities, e.g., nitrogen, hydrogen, carbon dioxide and paraffinic hydrocarbons of one to four carbon atoms, which are present in such feed gas mixtures do not adversely affect the present reaction.

EXAMPLE 11

The present example shows the use of dimethyl ether in an amount corresponding to 10 molar percent relative to the methanol in the feed, in an amount corresponding to the molar proportion of methanol of Example 1. An equivalent molar proportion of water is also charged. A similar result is obtained to the results of Example 1 in achieving the production of acetic acid. A similar result is obtained when the feedstock contains 10 molar percent methyl acetate with the methanol, and also with an excess of water, 10 percent over the stoichiometric. Consequently, methyl acetate, dimethyl ether, as well as an alkyl halide, e.g., methyl iodide in the present example can be used in place of, or in addition to, the alcohol feed.

EXAMPLE 12

When the process of Example 1 is repeated, but with the substitution of an equimolar proportion of methyl bromide for methyl iodide, a similar product distribution is obtained. However, the reaction rate is somewhat lower.

EXAMPLE 13

A series of runs was carried out to demonstrate the effect of temperature on the decomposition of rhodium nitrate to produce the thermal decomposition products that are useful as catalyst components in this invention. In this series of runs, the procedure for preparing the supported catalyst component set out in Example 1 was followed with the exception that the temperature for decomposing the rhodium nitrate supported on the high surface area carbon was varied from 275° to 640°C. After the various catalyst components were prepared at the differing thermal decomposition temperatures, they were used in a carbonylation process wherein methyl alcohol was carbonylated according to the procedures of Example 1, but at a reaction temperature of 200°C. The following Table 2 shows the various runs carried out in the series:

TABLE 2

| Run No. | Rhodium Nitrate Decomposition Temperature (°C) | Mole Percent Methanol Conversion | Grams of Acetic Acid Produced per gram of Rhodium per hour |
|---|---|---|---|
| 1 | 275 | 19.2 | 19.4 |
| 2 | 420 | 19.3 | 20.0 |
| 3 | 530 | 21.8 | 24.3 |
| 4 | 640 | 24.1 | 25.0 |

EXAMPLE 14

A series of runs was carried out to demonstrate the effect of time on the decomposition of rhodium nitrate to produce the thermal decomposition products that are useful as catalyst components in this invention. In this series of runs, the procedure for preparing the supported catalyst component set out in Example 1 was followed with the exception that the time for decomposing the rhodium nitrate at 275°C was varied from 3 minutes to 16 hours. After the various catalyst components were prepared at the differing thermal decomposition times, they were used in a carbonylation process wherein methyl alcohol was carbonylated according to the procedures of Example 1, but at a reaction temperature of 200°C. The following Table 3 shows the various runs carried out in this series:

TABLE 3

| Run No. | Rhodium Nitrate Decomposition Time | Mole percent Methanol Conversion | Grams of Acetic Acid Produced per gram of Rhodium Per Hour |
|---|---|---|---|
| 1 | 3 min. | 20.8 | 20.6 |
| 2 | 2.5 hr. | 20.8 | 22.9 |
| 3 | 16 hr. | 18.5 | 21.2 |

Polyhydric alcohols, cyclic ethers and lactones may also be employed as starting materials for the production of polybasic acids, for example, catechol to yield ortho phthalic acid or 1,4-butanediol to yield adipic acid, ethylene oxide to yield succinic acid. These feedstocks when subjected to reaction with carbon monoxide under the conditions described herein with the catalyst of the invention yield polybasic acids or esters including lactones.

The supported catalysts of the present invention are superior to the prior art supported catalysts of the iron group, namely, iron, cobalt and nickel. The present catalysts have been found to avoid the previous difficulties of metal loss from the supported catalyst such as nickel because of the formation of volatile carbonyls, e.g., the nickel and cobalt carbonyls which result in the rapid loss of the respective nickel or cobalt catalytic components. It is found that the catalysts described herein are stable for long periods of time against the presence of carbon monoxide without appreciable volatilization of the active components from the support.

The present invention is also distinguished over the prior art in the use of an alcohol as the preferred feedstock, without the necessity of the presence of olefins to form the desired carboxylic acid and ester. The present catalysts have been found to avoid the formation of hydrocarbons such as olefins which are undesirable in the process.

What is claimed is:

1. A process for the carbonylation of a reactant selected from the group consisting of alkanols containing from one to 20 carbon atoms, phenol, catechol, 1,4-butanediol, ethylene oxide, dimethyl ether, methyl acetate and methyl iodide by reacting at least one of said reactants with carbon monoxide in the presence of a supported catalyst system including as precursors (1) the thermal decomposition product of rhodium nitrate dispersed upon a carrier, and (2) at least one halogen component provided by a material selected from iodine, bromine, iodide compounds and bromide compounds, said reacting being carried out in the vapor phase at a temperature of from 50° to 500°C, said reacting also being in the presence of water when said reactant consists of ethylene oxide, dimethyl ether, methyl acetate and methyl iodide, and said thermal decomposition product of rhodium nitrate being prepared by dispersing rhodium nitrate upon said carrier and thermally decomposing said rhodium nitrate at a temperature of about 250°C to about 750°C for a period of from about 1 minute to about 24 hours.

2. The process of claim 1 wherein said halogen component is selected from the group consisting of bromine, iodine, hydrogen bromide, hydrogen iodide, alkyl bromide, alkyl iodide, phenyl bromide, phenyl iodide, ammonium bromide, ammonium iodide, alkyl carbonyl bromide, alkyl carbonyl iodide, phenyl carbonyl bromide, phenyl carbonyl iodide, trihydrocarbyl ammonium bromide, trihydrocarbyl ammonium iodide, trihydrocarbyl phosphonium bromide, trihydrocarbyl phosphonium iodide, trihydrocarbyl arsonium bromide, trihydrocarbyl arsonium iodide, trihydrocarbyl stibonium bromide, trihydrocarbyl stibonium iodide, tetrahydrocarbyl ammonium bromide, tetrahydrocarbyl ammonium iodide, tetrahydrocarbyl phosphonium bromide, tetrahydrocarbyl phosphonium iodide, tetrahydrocarbyl arsonium bromide, tetrahydrocarbyl arsonium iodide, tetrahydrocarbyl stibonium bromide and tetrahydrocarbyl stibonium iodide.

3. The process of claim 1 wherein said halogen component is selected from iodine and iodide compounds.

4. The process of claim 3 wherein said halogen component is selected from the group consisting of iodine, hydrogen iodide and alkyl iodide.

5. The process of claim 1 wherein the partial pressure of carbon monoxide is from 0.1 psia to 15,000 psia.

6. The process of claim 5 wherein said reactants are selected from the group consisting of methanol and methyl acetate.

7. The process of claim 6 wherein said halogen component is selected from the group consisting of iodine, hydrogen iodide and methyl iodide.

8. The process of claim 7 in which said reactants are a mixture of methanol and methyl acetate and wherein the molar ratio of methanol to methyl acetate is in the range of 0.001 to 10,000.

9. The process of claim 8 wherein said carrier is carbon.

* * * * *